US006779511B2

United States Patent
Tonetti et al.

(10) Patent No.: US 6,779,511 B2
(45) Date of Patent: Aug. 24, 2004

(54) METHOD AND DEVICE FOR CONTROLLING THE FUEL QUANTITY INJECTED INTO AN INTERNAL COMBUSTION ENGINE, IN PARTICULAR A DIESEL ENGINE EQUIPPED WITH A COMMON RAIL INJECTION SYSTEM

(75) Inventors: Marco Tonetti, Turin (IT); Enrico Lanfranco, Moncalieri (IT)

(73) Assignee: C.R.F. Societa Consortile per Azoni, Orbassano (IT)

( * ) Notice: Subject to any disclaimer, the term of this patent is extended or adjusted under 35 U.S.C. 154(b) by 0 days.

(21) Appl. No.: 10/633,688

(22) Filed: Aug. 5, 2003

(65) Prior Publication Data

US 2004/0089273 A1 May 13, 2004

(30) Foreign Application Priority Data

Aug. 6, 2002 (IT) .................................... TO2002A0698

(51) Int. Cl.$^7$ .............................................. F00M 51/00
(52) U.S. Cl. ........................ 123/480; 123/435; 123/436
(58) Field of Search ................................ 123/436, 435, 123/480, 478, 434, 681

(56) References Cited

U.S. PATENT DOCUMENTS

| | | | | |
|---|---|---|---|---|
| 4,357,662 A | * | 11/1982 | Schira et al. ................. | 701/111 |
| 4,603,669 A | * | 8/1986 | Takemoto et al. ........... | 123/357 |
| 6,006,156 A | * | 12/1999 | Tozzi ........................... | 701/114 |
| 6,085,144 A | * | 7/2000 | Tozzi ........................... | 701/114 |
| 6,367,452 B1 | * | 4/2002 | Shima et al. ................. | 123/457 |
| 6,408,242 B1 | * | 6/2002 | Tozzi ........................... | 701/114 |

* cited by examiner

Primary Examiner—John T. Kwon
(74) Attorney, Agent, or Firm—Liniak, Berenato & White

(57) ABSTRACT

A method of controlling the fuel quantity injected into an internal combustion engine having a number of injectors; for each injection, the method including the steps of determining a nominal energization time; determining a correction energization time; determining, in the event the required nominal fuel quantity is below a predetermined threshold, a corrected energization time by correcting the nominal energization time as a function of the correction energization time; and exciting an injector for the corrected energization time; the correction energization time being determined by: performing, in the presence of a predetermined series of operating conditions of the engine, a succession of energizations of the injector of gradually increasing energization times; determining a quantity related to the output torque of the engine; and calculating the correction energization time as a function of the quantity related to the output torque.

20 Claims, 2 Drawing Sheets

METHOD AND DEVICE FOR CONTROLLING THE FUEL QUANTITY INJECTED INTO AN INTERNAL COMBUSTION ENGINE, IN PARTICULAR A DIESEL ENGINE EQUIPPED WITH A COMMON RAIL INJECTION SYSTEM

The present invention relates to a method and device for controlling the fuel quantity injected into an internal combustion engine.

The present invention may be used to advantage, though not exclusively, in direct-injection diesel engines with a common rail injection system, to which the following description refers purely by way of example.

BACKGROUND OF THE INVENTION

As is known, in current internal combustion engines, the fuel quantity actually injected into each cylinder at each injection may differ, at times even considerably, from the nominal quantity calculated by the electronic central injection control unit to meet driver requirements, and on the basis of which injector energization time is currently determined.

The difference between the nominal fuel quantity to be injected and the quantity actually injected is caused by various factors, foremost of which are deviations in injector characteristics caused by process spread and eventual drift, and ageing of the injection system.

Differing nominal and injected fuel quantities are always undesirable, but particularly so in the case of last-generation injection systems implementing multiple-injection strategies, in which small quantities of fuel are injected close to the main injection to assist the main injection at the actual fuel combustion stage.

In the case of small fuel quantities, the error introduced sometimes results in no fuel being injected at all, thus defeating the object of multiple injection strategies, and so increasing the noise and exhaust gas emission levels of the engine.

SUMMARY OF THE INVENTION

It is an object of the present invention to provide a method and device for controlling the fuel quantity injected into an internal combustion engine, in particular a diesel engine equipped with a common rail injection system, designed to eliminate the aforementioned drawbacks.

According to the present invention, there is provided a control method for controlling the fuel quantity injected into an internal combustion engine comprising a number of injectors, each for injecting a given fuel quantity into a respective cylinder; for each injection inside a cylinder of said engine, said method comprising the step of determining a nominal energization time of the injector involved in said injection, as a function of injection pressure and the required nominal fuel quantity; and said method being characterized by comprising the steps of: determining a correction energization time as a function of injection pressure and the cylinder involved in the injection; determining, in the event the required nominal fuel quantity is below a predetermined threshold, a corrected energization time by correcting said nominal energization time as a function of said correction energization time; and exciting said injector for a time equal to said corrected energization time; said step of determining said correction energization time comprising the steps of: performing, in the presence of a predetermined series of operating conditions of said engine, a succession of energizations of said injector of gradually increasing energization times; determining a quantity related to the output torque of said engine in response to said succession of energizations; and calculating said correction energization time as a function of said quantity related to the output torque.

According to the present invention, there is also provided a control device for controlling the fuel quantity injected into an internal combustion engine comprising a number of injectors, each for injecting a given fuel quantity into a respective cylinder; said control device being characterized by comprising: energization means for determining a nominal energization time of said injector as a function of injection pressure and the nominal fuel quantity required by the user; correcting means for determining a correction energization time as a function of injection pressure and the cylinder involved in said injection; control means for determining, in the event the required nominal fuel quantity is below a predetermined threshold, a corrected energization time by correcting said nominal energization time as a function of said correction energization time; and drive means for exciting said injector for a time equal to said corrected energization time; said correcting means comprising: control means for performing, in the presence of a predetermined series of operating conditions of said engine, a succession of energizations of an injector with gradually increasing energization times; detecting means for determining a quantity related to the output torque of said engine in response to said succession of energizations; and processing means for calculating said correction energization time as a function of said quantity related to the output torque.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
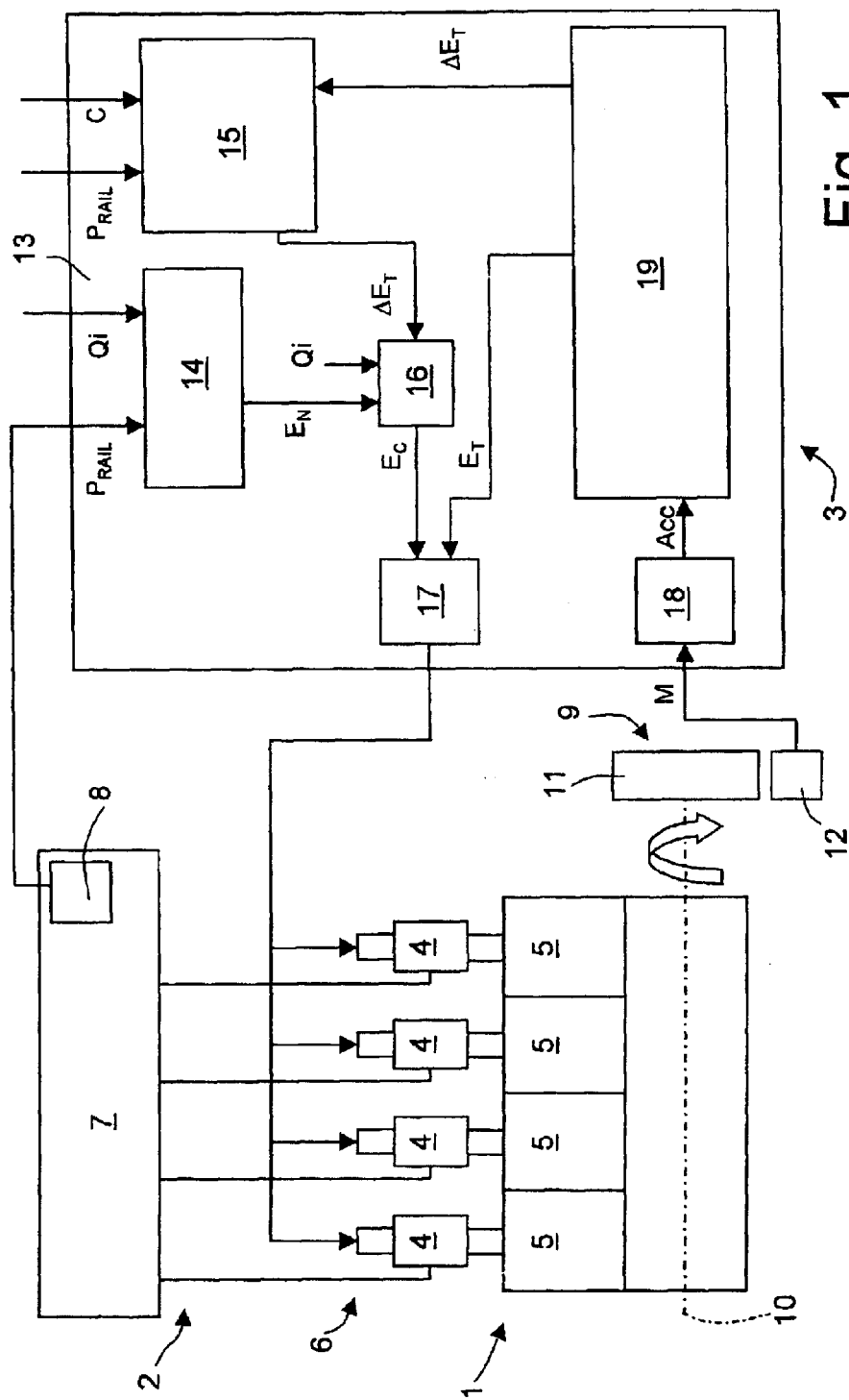
FIG. 1 shows, schematically, injection control of an internal combustion engine in accordance with the invention.

Number 1 in FIG. 1 indicates a direct-injection diesel engine equipped with a common rail injection system 2, and an electronic control system 3 for controlling the fuel quantity to be injected into engine 1 at each injection.

Of common rail injection system 2 and electronic control system 3, FIG. 1 only shows the parts strictly necessary for a clear understanding of the present invention.

Common rail injection system 2 comprises a number of injectors 4 supplying high-pressure fuel to respective cylinders 5 of engine 1; a high-pressure feed circuit 6 comprising a common rail 7 supplying high-pressure fuel to injectors 4; and a low-pressure feed circuit (not shown) supplying low-pressure fuel to high-pressure feed circuit 6.

Common rail injection system 2 implements a fuel injection strategy in which consecutive multiple injections are made into each cylinder 5 of engine 1 at each engine cycle.

Figure 2:
FIG. 2 shows an injection strategy implemented by the internal combustion engine.

In the example shown in FIG. 2, the multiple injections comprise a main injection MAIN made around the end-of-compression top dead centre position; a first pre-injection PIL before the main injection and made during the compression stroke; a second pre-injection PRE before the main injection MAIN and after the first pre-injection PIL; and a post-injection AFTER following the main injection MAIN; the second pre-injection PRE and the post-injection AFTER being made close enough to the main injection MAIN to assist the main injection in the actual fuel combustion stage.

More detailed information about multiple injections can be found in European Patent Application 00104651.5 filed by the Applicant on Mar. 3, 2000 and published under the number EP1035314 on Sep. 13, 2000.

With reference to FIG. 1, electronic control system 3 comprises a pressure sensor 8 located in common rail 7 and supplying an electric signal indicating the fuel pressure $P_{RAIL}$ in common rail 7; and a detecting device 9 for instantaneously detecting the speed and angular position of the drive shaft 10 (shown schematically by a dot-and-dash line in FIG. 1), and in turn comprising a known pulse wheel 11 fitted to drive shaft 10, and an electromagnetic sensor 12 associated with pulse wheel 11 and generating a movement signal M indicating the speed and angular position of drive shaft 10.

Electronic control system 3 also comprises an electronic central control unit 13 connected to pressure sensor 8 and detecting device 9, and supplying drive signals for injectors 4.

Electronic central control unit 13 comprises a nominal energization block 14, which calculates a nominal energization time $E_N$ of injectors 4 for each injection and each injector 4 as a function of the fuel pressure $P_{RAIL}$ in common rail 7 of injection system 2, and of the nominal fuel quantity $Q_i$ to be injected into engine 1.

More specifically, nominal energization block 14 stores a nominal energization map defining the nominal energization time/quantity injected by an injector 4 characteristic as a function of the fuel pressure $P_{RAIL}$ in common rail 7, i.e. containing, for each value of nominal fuel quantity $Q_i$ to be injected, and of fuel pressure $P_{RAIL}$ in common rail 7, a respective nominal energization time $E_N$ value of injector 4.

Unlike known control systems, control system 3 according to the present invention makes a specific correction of small nominal fuel quantities to eliminate the difference between these and the fuel quantities actually injected into the engine.

In the example shown, and as described in detail later on, control system 3 implements a correction strategy on the energization times of injectors performing injections of a fuel quantity within the "low-flow" region of the nominal energization time/injected quantity characteristic; which region is defined by all the energization time/injected quantity values in the initial portion (increasing from zero) and below a limit threshold $S_Q$ corresponding to a predetermined fuel quantity.

With reference to FIG. 1, electronic central control unit 13 also comprises a correction block 15 for correcting energization times $E_N$ relating to fuel quantities below threshold $S_Q$, and which receives the fuel pressure $P_{RAIL}$ in common rail 7, and information C relative to the cylinder to be injected, and supplies a correction or offset energization time $E_T$ indicating the correction to be made to nominal energization time $E_N$ relative to a fuel quantity below threshold $S_Q$, so that the fuel quantity actually injected substantially equals the nominal fuel quantity $Q_i$ required by the user.

More specifically, correction block 15 comprises an electronic correction map defined, for example, by a three-dimensional matrix, and containing, for each value of fuel pressure $P_{RAIL}$ in common rail 7, and as a function of the cylinder to be injected, a respective correction energization time $E_T$ indicating the correction to be made to a respective nominal energization time $E_N$ generated by nominal energization block 14 and supplied to control injector 4 in a given engine cycle.

In the example shown, correction energization time $E_T$ may be calculated by processing the electronic correction map by means of a known linear interpolation operation (not described in detail) and as a function of the cylinder C to be injected, and of injection pressure $P_{RAIL}$.

Electronic central control unit 13 implements an update strategy—described in detail later on—on correction energization times $E_T$ in the electronic correction map to ensure elimination of the difference between the nominal and actually injected fuel quantities, caused by deviations, e.g. induced by ageing of the injectors, in the nominal characteristics of the injectors.

In connection with the above, it should be pointed out that correction energization times $E_T$ may be initialized when calibrating common rail injection system 2 under nominal injector operating conditions, or may be calculated directly using the update strategy described below.

With reference to FIG. 1, electronic central control unit 13 also comprises a processing block 16, which receives nominal energization time $E_N$, correction energization time $E_T$, and the nominal fuel quantity $Q_i$ to be injected, and which supplies a corrected energization time $E_C$.

Processing block 16 determines whether the fuel quantity to be injected is below threshold $S_Q$ or not, and, depending on the outcome, whether nominal energization time $E_N$ is to be corrected or not. In the example shown, if the nominal fuel quantity is above threshold $S_Q$, processing block 16 determines corrected energization time $E_C$ as a function of nominal energization time $E_N$. Conversely, i.e. if the nominal fuel quantity is below threshold $S_Q$, processing block 16 calculates corrected energization time $E_C$ by correcting nominal energization time $E_N$ as a function of correction energization time $E_T$.

More specifically, if the nominal fuel quantity is below threshold $S_Q$, processing block 16 may determine corrected energization time $E_C$ by means of a predetermined operation, e.g. in the example shown, an algebraic subtraction operation between nominal energization time $E_N$ and correction energization time $E_T$.

In the example shown, the above correction is conveniently applied to injections of small fuel quantities, which, in the multiple-injection strategy described above, are first pre-injection PIL, second pre-injection PRE, and post-injection AFTER.

In connection with the above, it should be pointed out that processing block 16 may make the above correction of nominal energization time $E_N$ by performing a further operation to vary correction energization time $E_T$ (between zero and its whole value) as a function of the type of injection to be made—so as to adjust the injected quantity according to whether the type of injection is first pre-injection PIL, second pre-injection PRE, or post-injection AFTER—and as a function of nominal energization time $E_N$.

With reference to FIG. 1, electronic central control unit 13 also comprises a control block 17, which receives corrected energization time $E_C$, and supplies the drive signals for controlling injectors 4.

With reference to FIG. 1, electronic central control unit 13 also comprises an acceleration computing block 18, which receives the movement signal M supplied by detecting device 9, and processes it to supply the instantaneous acceleration Acc of drive shaft 10, which is used to update correction energization times $E_T$ in the electronic correction map as described in detail later on; and an updating block 19, which receives acceleration Acc to implement the above update strategy of the electronic correction map in correction block 15.

More specifically, the electronic correction map update strategy is based on the principle of performing, for each correction energization time $E_T$ relative to an injection to be made in a given cylinder 5 and at a given pressure $P_{RAIL}$, a succession of energizations, with gradually increasing energization times, of the injector 4 relative to cylinder 5; measuring a quantity related to the output torque of drive shaft 10 in response to the succession of energizations; and determining correction energization time $E_T$ as a function of the measured quantity. In the example shown, the quantity related to the output torque of drive shaft 10 is defined by acceleration Acc of drive shaft 10.

Updating block 19 updates correction energization time $E_T$ as a function of measured acceleration Acc by performing a series of operations described below with reference to the FIG. 3 flow chart.

Figure 3:
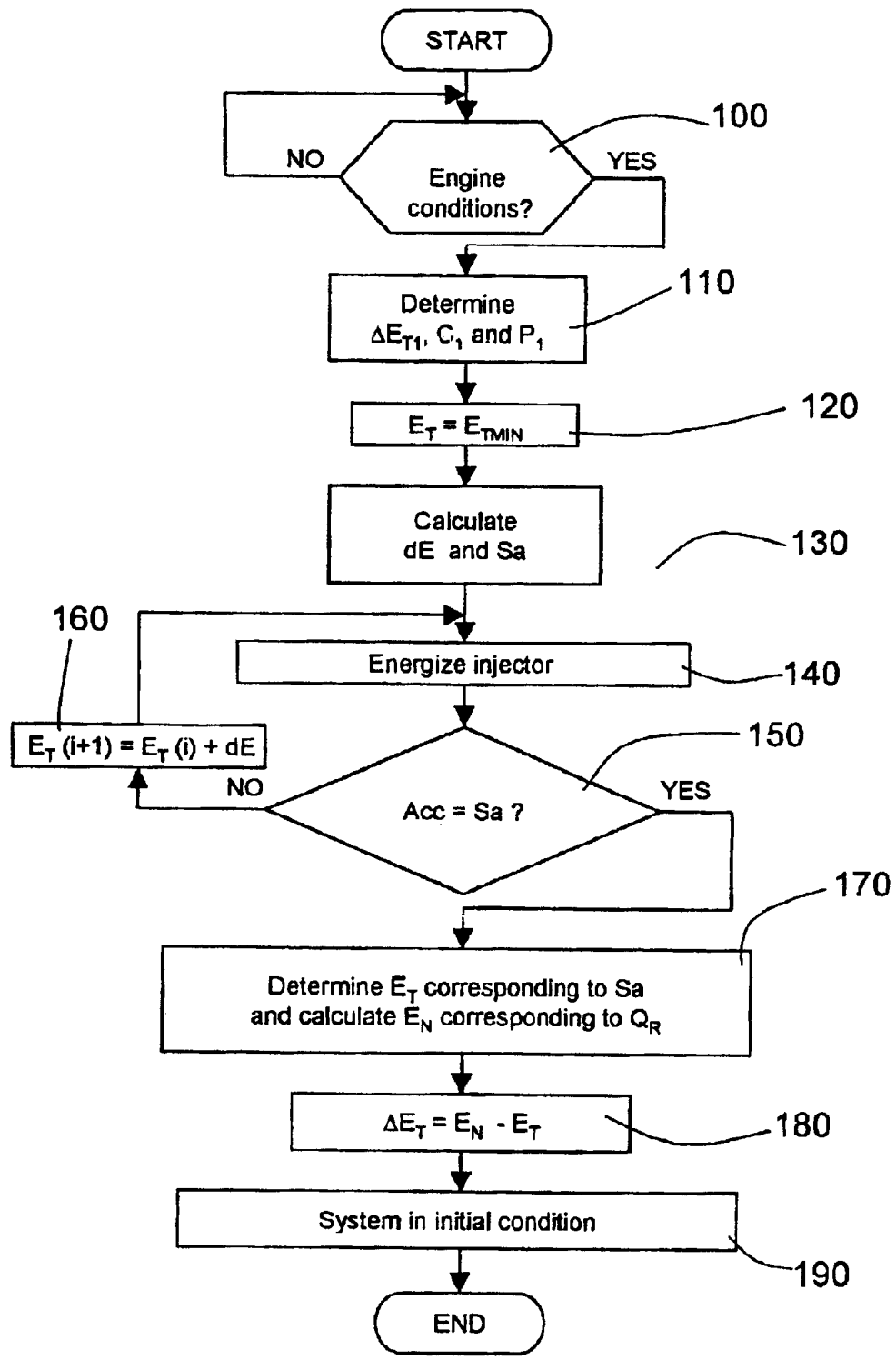
FIG. 3 shows a block diagram of a series of operations performed in the control method according to the teachings of the present invention.

As shown in FIG. 3, in a first block 100, updating block 19 determines whether the operating conditions of engine 1 and common rail injection system 2 permit updating of the correction map in correction block 15.

More specifically, the operating conditions of engine 1 permitting updating of the correction map are: release condition of engine 1, i.e. zero fuel quantity injected and no engine torque increase demanded; engine temperature above a given minimum threshold; and drive shaft rotation speed within a predetermined rotation speed range.

If the operating conditions of engine 1 permitting updating of the correction map are present (YES output of block 100), block 100 goes on to a block 110. Conversely, if the engine operating conditions are not present (NO output of block 100), block 100 goes back to its input until such operating conditions occur.

Block 110 determines the correction energization time $E_T$ to be updated in the correction map, and therefore the corresponding map coordinates defined by the cylinder and pressure. For the sake of simplicity, reference is made below to updating a correction energization time $E_{T1}$ in the electronic correction map corresponding to a cylinder $C_1$ and fuel injection pressure $P_1$.

At this step, electronic central control unit 13 checks the fuel pressure $P_{RAIL}$ in common rail 7 in known manner by means of a known pressure regulator (not shown), and sets it to pressure $P_1$ relative to the correction energization time $E_{T1}$ to be updated.

Block 110 is followed by a block 120, which determines the initial energization time $E_T$ of injector 4 relative to cylinder $C_1$. More specifically, in block 120, the energization time $E_T$ of the cylinder $C_1$ injector is initialized at a value equal to a minimum energization time $E_{Tmin}$ ($E_T = E_{Tmin}$), which may be set to generate injection of, say, a zero fuel quantity on the cylinder $C_1$ injector.

Block 120 is followed by a block 130, which determines: an incremental energization time dE indicating an increment to be added, at each engine cycle, to the energization time $E_T$ of the cylinder $C_1$ injector to generate the increasing succession of injector energizations; and an acceleration threshold Sa, which is used as a reference value to update correction energization time $E_T$.

More specifically, acceleration threshold Sa corresponds to acceleration of drive shaft 10 following injection of a reference fuel quantity $Q_R$ into cylinder $C_1$, and is determined by adding an additional acceleration value Kag to a predetermined calibration acceleration value Ka.

More specifically, additional acceleration value Kag is calculated by calculating the arithmetic average of a series of accelerations measured prior to the step of performing the succession of injector energizations.

Acceleration threshold Sa is conveniently determined according to the following equation:

$$Sa = Ka + Kag = Ka + \frac{1}{N}\sum_{i=1}^{N} Acc_i$$

where the $Acc_i$ factors represent a series of accelerations of drive shaft 10 measured prior to commencing the increasing succession of injector energizations.

Block 130 is followed by a block 140, in which the step of exciting the cylinder $C_1$ injector 4 is commenced. More specifically, in block 140, updating block 19 supplies the calculated energization time $E_T$ to control block 17, which generates the corresponding drive signal to be supplied to the cylinder $C_1$ injector.

Block 140 is followed by a block 150, which acquires acceleration Acc of drive shaft 10, and compares this with acceleration threshold Sa.

If acceleration Acc is below acceleration threshold Sa (Acc<Sa) (NO output of block 150), block 150 goes on to a block 160. Conversely, if acceleration Acc substantially equals acceleration threshold Sa (Acc=Sa) (Yes output of block 150), block 150 goes on to a block 170.

In block 160, energization time $E_T$ is incremented by a value equal to incremental energization time dE. More specifically, block 160 calculates the energization time $E_T(i+1)$ of the cylinder $C_1$ injector in the i+1-th engine cycle according to the equation:

$$E_T(i+1) = E_T(i) + dE$$

where $E_T(i)$ is the energization time of the previous injection (i-th injection corresponding to the i-th engine cycle), and $E_T(i+1)$ is the energization time of the injection to be made (corresponding to engine cycle i+1).

Block 160 is followed by block 140, in which the incremented energization time $E_T$ (relative to the i+1-th injection) is supplied to control block 17, which generates the corresponding drive signal to be supplied to the cylinder $C_1$ injector in the i+1-th engine cycle.

More specifically, the sequence of operations performed in blocks 140, 150 and 160 is repeated cyclically to produce an acceleration "ramp" of drive shaft 10, which terminates when the acceleration threshold Sa of drive shaft 10 is found to be reached in block 150.

As stated, when acceleration threshold Sa is reached (YES output of block 150), block 150 is followed by block 170, in which, by means of the nominal energization map (in nominal energization block 14), updating block 19 determines the nominal energization time $E_N$ relative to reference fuel quantity $Q_R$ corresponding to the fuel quantity injected by the cylinder $C_1$ injector at the last engine cycle, i.e. the engine cycle in which acceleration threshold Sa was reached.

Block 170 is followed by a block 180, in which updating block 19 calculates a new correction energization time $E_T$ in the correction map as a function of energization time $E_T$ and nominal energization time $E_N$.

More specifically, block 180 performs a subtraction operation between the nominal energization time $E_N$ calculated in block 170, and the energization time $E_T$ corresponding to acceleration threshold Sa being reached. In other words, block 180 performs the following equation:

$$E_T = E_N - E_T$$

The correction energization time $E_T$ resulting from the above operation is updated in the electronic correction map following an appropriate known filtration operation.

In connection with the above, it should be pointed out that, once a correction energization time $E_T$ is updated, the above operations are repeated sequentially for all the non-updated correction energization times $E_T$ in the correction map.

Acceleration computing block 18 provides for processing the movement signal M to calculate acceleration signal Acc as a function of speed and angular position, and implements a pulse wheel 11 correction strategy to filter from acceleration signal Acc any geometrical errors occurring in the manufacture and assembly of pulse wheel 11.

More specifically, for a four-cylinder engine, acceleration Acc of drive shaft 10 is calculated by processing the travel times of two angular windows, each with predetermined angular width and position with respect to the top dead centre TDC positions of the cylinders in order of combustion.

The acceleration correction strategy is implemented when engine 1 is in the release condition, is at a temperature above a predetermined threshold, and is at such a speed that deceleration is substantially constant.

In the example shown, the acceleration correction strategy is based on determining an angular correction coefficient Kc of one of the two intervals, e.g. the second angular interval of a size hereinafter indicated β, and assuming the other angular interval, of a size hereinafter indicated α, is correct. This strategy therefore assumes no errors in the speed and acceleration Acc calculation with respect to the first angular interval α.

More specifically, angular correction coefficient Kc of second angular interval β is calculated by performing the following operations:

movement signal M is processed to determine the pulse wheel 11 travel times t(2i) and t(2i+2) (relative to cycles 2i and 2i+2 respectively) of the first angular window relative to first angular interval α:

movement signal M is processed to determine the travel time t(2i+1) (relative to cycle 2i+1) of the second angular window relative to second angular interval β;

assuming the angular window relative to first angular interval α is correct, and that deceleration is constant, engine speed is calculated according to the equation:

$$\omega(2i+1) = \frac{\omega(2i) + \omega(2i+2)}{2}$$

which, substituting β/t(2i+1), α/t(2i) and α/t(2i+2) for ω(2i+1), ω(2i) and ω(2i+2) respectively, gives the equation by which to calculate the angular correction coefficient Kc employed by acceleration computing block 18 to determine the error in second angular interval β:

$$Kc = \frac{\beta}{\alpha} = \frac{1}{2}\left(\frac{t(2i+1)}{t(2i)} + \frac{t(2i+1)}{t(2i+2)}\right)$$

In connection with the above, it should be pointed out that, to minimize and further filter the effect on the Acc acceleration calculation of disturbance or noise sources produced, for example, by rough road conditions or other causes, acceleration computing block 18 provides for calculating a corrected output acceleration Acc value by processing both acceleration Acc of the cylinder considered, and the accelerations of adjacent cylinders in order of combustion.

More specifically, acceleration computing block 18 corrects acceleration Acc of the cylinder considered, and the accelerations of adjacent cylinders in order of combustion, and then calculates the acceleration Acc to be supplied at the output by implementing an arithmetical average of the corrected accelerations.

The advantages of the present invention will be clear from the foregoing description.

In particular, the main advantage of the present invention lies in compensating for all the factors (injector characteristic spread and drift, injection system ageing, etc.) responsible for deviations in small injected fuel quantities, with obvious benefits in terms of reducing noise caused by dispersion of the fuel quantity injected by first pre-injection PIL and second pre-injection PRE, and controlling exhaust gas emission levels over the working life of the vehicle.

The device is also particularly advantageous in that the step of updating the electronic correction map in correction block 15, besides ensuring minimum oscillations of the "driveline" and therefore of the vehicle system as a whole, also ensures barely perceptible combustion noise by gradually increasing very small injected quantities.

Clearly, changes may be made to the device as described and illustrated herein without, however, departing from the scope of the present invention.

What is claimed is:

1. A control method for controlling the fuel quantity injected into an internal combustion engine (1) comprising a number of injectors (4), each for injecting a given fuel quantity into a respective cylinder (5); for each injection inside a cylinder (5) of said engine (1), said method comprising the step of:

determining (14) a nominal energization time ($E_N$) of the injector involved in said injection, as a function of injection pressure ($P_{RAIL}$) and the required nominal fuel quantity ($Q_i$);

said method being characterized by also comprising the steps of:

determining (15) a correction energization time ($E_T$) as a function of injection pressure ($P_{RAIL}$) and the cylinder (5) involved in the injection;

determining (16), in the event the required nominal fuel quantity ($Q_i$) is below a predetermined threshold ($S_Q$), a corrected energization time ($E_C$) by correcting said nominal energization time ($E_N$) as a function of said correction energization time ($E_T$); and exciting said injector for a time equal to said corrected energization time ($E_C$);

said step of determining said correction energization time ($E_T$) comprising the steps of:

performing, in the presence of a predetermined series of operating conditions of said engine (1), a succession of energizations of said injector (4) of gradually increasing energization times ($E_T$);

determining a quantity (Acc) related to the output torque of said engine (1) in response to said succession of energizations; and calculating said correction energization time ($E_T$) as a function of said quantity (Acc) related to the output torque.

2. A control method as claimed in claim 1, characterized in that said step of calculating the correction energization time ($E_T$) comprises the step of determining an actual energization time ($E_T$) of said injector, when said quantity (Acc) related to the output torque of said engine in response to said succession of energizations satisfies a predetermined relationship with a threshold (Sa) corresponding to a reference fuel quantity ($Q_R$).

3. A control method as claimed in claim 2, characterized in that said predetermined relationship is defined by the condition that said quantity (Acc) related to the output torque of said engine in response to said succession of energizations be equal to said threshold (Sa).

4. A control method as claimed in claim 2, characterized in that said step of calculating said correction energization time ($E_T$) comprises the step of calculating said correction energization time ($E_T$) as a function of said actual energization time ($E_T$) and of the nominal energization time ($E_N$) corresponding to the reference fuel quantity ($Q_R$).

5. A control method as claimed in claim 1, characterized by comprising the step of generating a correction map (15) storing a number of correction energization times ($E_T$), each relative to a respective operating state of the injection system defined by injection pressure ($P_{RAIL}$) and by the cylinder (C) to be injected.

6. A control method as claimed in claim 5, characterized in that said step of determining said correction energization time ($E_T$) comprises the step of updating each said correction energization time ($E_T$) in said correction map as a function of said actual energization time ($E_T$).

7. A control method as claimed in claim 2, characterized in that said step of performing a succession of energizations of said injector (4) of gradually increasing energization times ($E_T$) comprises the steps of:

determining (120) an initial energization time ($E_{Tmin}$) of the injector (4) involved in said succession of energizations;

determining (130) an incremental energization time (dE) indicating an increment to be added, at each engine cycle, to the initial energization time ($E_{Tmin}$) to generate said succession of energizations; and determining said threshold (Sa) as a function of the reference fuel quantity ($Q_R$).

8. A control method as claimed in claim 1, characterized in that said step of determining a quantity (Acc) related to the output torque of said engine (1) in response to said succession of energizations comprises the step of determining (150) the acceleration (Acc) of said engine (1).

9. A control method as claimed in claim 8, characterized in that said step of determining an actual energization time ($E_T$) of said injector (4) comprises the step of determining the actual energization time ($E_T$) when said acceleration (Acc) of said engine (1) satisfies a predetermined relationship with said threshold (Sa).

10. A control method as claimed in claim 8, characterized in that said step of determining the acceleration (Acc) of said engine (1) comprises the step of processing the travel times of at least two angular windows ($\alpha$, $\beta$) of a pulse wheel (11) fitted to the shaft (10) of said engine (1), each angular window having predetermined angular width and position.

11. A control method as claimed in claim 10, characterized in that said step of determining the acceleration (Acc) of said engine (1) comprises the step of determining a correction coefficient Kc of the angular interval of one of the two angular windows ($\alpha$, $\beta$) according to the following equation:

$$Kc = \frac{\beta}{\alpha} = \frac{1}{2}\left(\frac{t(2i+1)}{t(2i)} + \frac{t(2i+1)}{t(2i+2)}\right)$$

where $t(2i)$ and $t(2i+2)$ are the travel times of one of the two angular windows ($\alpha$) of said pulse wheel (11) in a cycle $2i$ and $2i+2$ respectively; and $t(2i+1)$ is the travel time of the other angular window ($\beta$) of said pulse wheel (11) in a cycle $2i+1$.

12. A control device (3) for controlling the fuel quantity injected into an internal combustion engine comprising a number of injectors (4), each for injecting a given fuel quantity into a respective cylinder (5); said control device (3) being characterized by comprising:

energization means (14) for determining a nominal energization time ($E_N$) of said injector (4) as a function of injection pressure ($P_{RAIL}$) and the nominal fuel quantity ($Q_i$) required by the user;

correcting means (15, 19) for determining a correction energization time ($E_T$) as a function of injection pressure ($P_{RAIL}$) and the cylinder (5) involved in said injection;

control means (16) for determining, in the event the required nominal fuel quantity ($Q_i$) is below a predetermined threshold ($S_Q$), a corrected energization time ($E_C$) by correcting said nominal energization time ($E_N$) as a function of said correction energization time ($E_T$); and drive means (16) for exciting said injector (4) for a time equal to said corrected energization time ($E_C$);

said correcting means (15, 19) comprising:

control means (140) for performing, in the presence of a predetermined series of operating conditions (100) of said engine (1), a succession of energizations of an injector (4) with gradually increasing energization times ($E_T$);

detecting means (150) for determining a quantity (Acc) related to the output torque of said engine (1) in response to said succession of energizations; and processing means (170, 180) for calculating said correction energization time ($E_T$) as a function of said quantity (Acc) related to the output torque.

13. A control device as claimed in claim 12, characterized in that said processing means (170, 180) comprise first calculating means (170) for determining an actual energization time ($E_T$) of said injector (4) when said quantity (Acc) related to the output torque satisfies a predetermined relationship with a threshold (Sa) corresponding to a reference fuel quantity ($Q_R$).

14. A control device as claimed in claim 13, characterized in that said predetermined relationship is defined by the condition that said quantity (Acc) related to the output torque of said engine in response to said succession of energizations be equal to said threshold (Sa).

15. A control device as claimed in claim 14, characterized in that said processing means (170, 180) comprise second calculating means (180) for determining said correction energization time ($E_T$) as a function of said actual energization time ($E_T$) and of the nominal energization time ($E_N$) corresponding to the reference fuel quantity ($Q_R$).

16. A control device as claimed in claim 12, characterized in that said correcting means (15) comprise a correction map

(15) storing a number of correction energization times ($E_T$), each relative to a respective operating state of the injection system (2) defined by injection pressure ($P_{RAIL}$) and by the cylinder (C) to be injected.

17. A control device as claimed in claim 12, characterized in that said correcting means (19) comprise:

third calculating means (110) for determining an initial energization time ($E_{Tmin}$) of the injector (4) involved in said succession of energizations; and fourth calculating means (130) for determining said threshold (Sa), and an incremental energization time (dE) indicating an increment to add, at each engine cycle, to said initial energization time ($E_{Tmin}$) to generate said succession of energizations.

18. A control device as claimed in claim 12, characterized by comprising measuring means (18) for supplying said correcting means (19) with said quantity related to the torque of the engine (1).

19. A control device as claimed in claim 18, characterized in that said quantity related to the torque of the engine (1) is defined by the acceleration of said engine (1).

20. A control device as claimed in claim 19, characterized by comprising a pulse wheel (11) fitted to the shaft (10) of said engine (1); and an electromagnetic sensor (12) associated with the pulse wheel (11) and generating a movement signal (M) related to the speed and angular position of the shaft (10); said measuring means (18) processing said movement signal (M) and said speed to supply the acceleration (Acc) of said shaft (10) of said engine (1).

* * * * *

UNITED STATES PATENT AND TRADEMARK OFFICE
CERTIFICATE OF CORRECTION

PATENT NO. : 6,779,511 B2
DATED : August 24, 2002
INVENTOR(S) : Tonetti et al.

It is certified that error appears in the above-identified patent and that said Letters Patent is hereby corrected as shown below:

Title page,
Item [73], Assignee, should read -- C.R.F. Societa Consortile per Azioni, Orbassano (IT) --

Signed and Sealed this

Twenty-fourth Day of May, 2005

JON W. DUDAS
*Director of the United States Patent and Trademark Office*